US008165827B2

(12) United States Patent
Savaresi et al.

(10) Patent No.: US 8,165,827 B2
(45) Date of Patent: Apr. 24, 2012

(54) METHOD FOR CALCULATING FORCES ACTING ON THE FOOTPRINT AREA OF A TYRE AND APPARATUS FOR CALCULATING SAID FORCES

(75) Inventors: Sergio Savaresi, Milan (IT); Mara Tanelli, Milan (IT); Peter Langthaler, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 624 days.

(21) Appl. No.: 12/224,787

(22) PCT Filed: Mar. 7, 2006

(86) PCT No.: PCT/IT2006/000134
§ 371 (c)(1),
(2), (4) Date: May 14, 2009

(87) PCT Pub. No.: WO2007/102175
PCT Pub. Date: Sep. 13, 2007

(65) Prior Publication Data
US 2009/0234591 A1    Sep. 17, 2009

(51) Int. Cl.
*G01L 1/00* (2006.01)
*G01M 17/02* (2006.01)
(52) U.S. Cl. .......................................... 702/41; 73/146
(58) Field of Classification Search .................. 702/41, 702/141; 73/146, 146.05
See application file for complete search history.

(56) References Cited

U.S. PATENT DOCUMENTS

| 5,913,240 | A | 6/1999 | Drähne et al. |
| 6,904,351 | B1 | 6/2005 | Hac |
| 2007/0240501 | A1* | 10/2007 | Mancosu et al. ............... 73/146 |
| 2008/0209995 | A1* | 9/2008 | Taylor et al. .................... 73/146 |

FOREIGN PATENT DOCUMENTS

| DE | 103 38 859 A1 | 3/2004 |
| EP | 0 887 211 A1 | 12/1998 |
| WO | WO 01/68388 A1 | 9/2001 |

* cited by examiner

*Primary Examiner* — Bryan Bui
(74) *Attorney, Agent, or Firm* — Finnegan, Henderson, Farabow, Garrett & Dunner, L.L.P.

(57) ABSTRACT

A method of calculating forces acting on the footprint area of a tire, the tire being mounted on a wheel in turn mounted on a hub for engagement with a vehicle, the tire being moved along a longitudinal direction substantially parallel to the ground, includes the following steps: detecting a first angular position of the footprint area; detecting a second angular position of a reference point substantially integral with the hub; comparing the first and second angular positions with each other to determine a phase displacement between the reference point and footprint area; determining a parameter representing an angular velocity of the wheel; calculating at least one longitudinal force in the footprint function of at least the phase displacement and the parameter. Also described is an apparatus for calculating the forces.

44 Claims, 8 Drawing Sheets

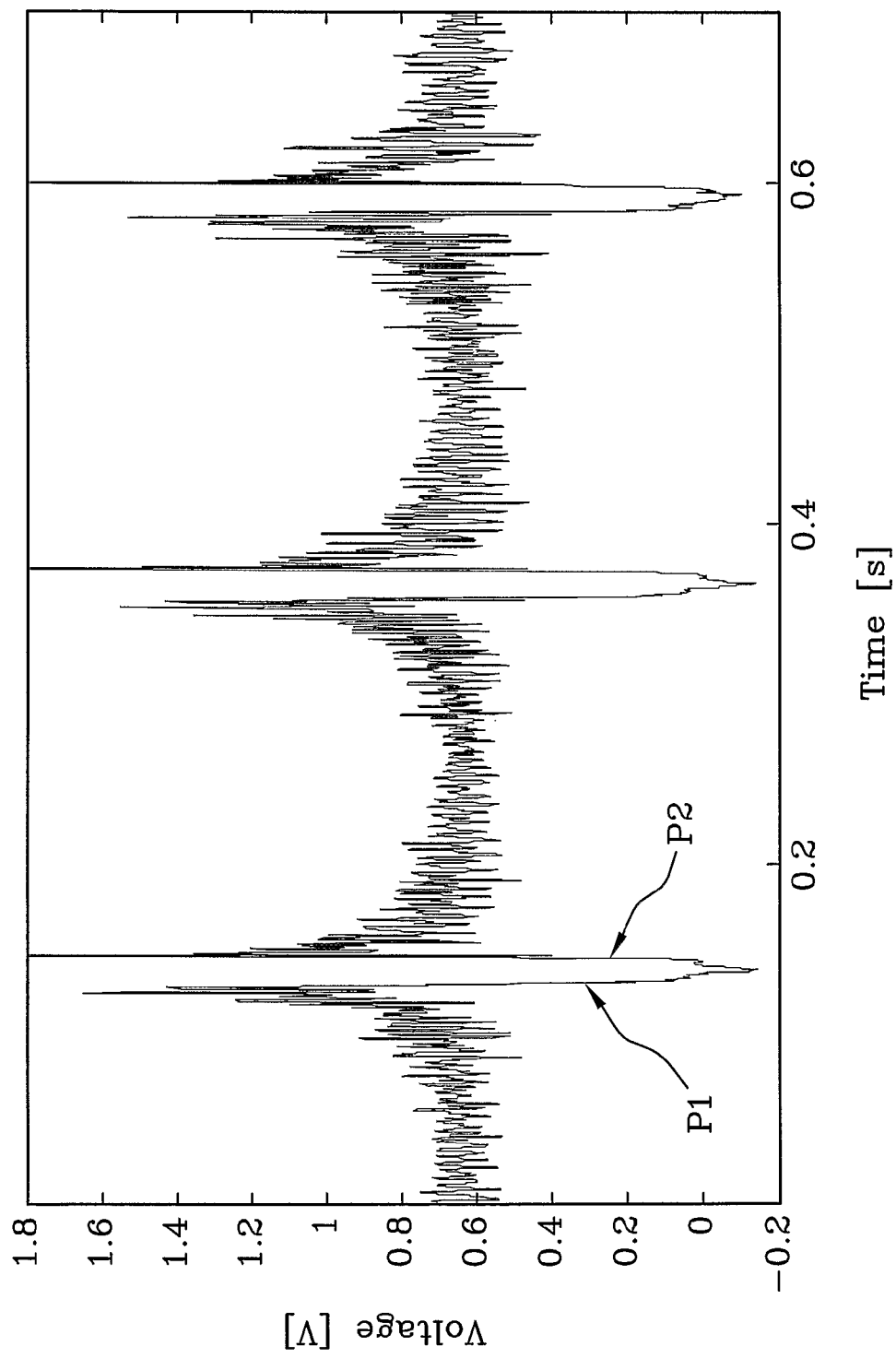

METHOD FOR CALCULATING FORCES ACTING ON THE FOOTPRINT AREA OF A TYRE AND APPARATUS FOR CALCULATING SAID FORCES

CROSS REFERENCE TO RELATED APPLICATION

This application is a national phase application based on PCT/IT2006/000134, filed Mar. 7, 2006, the content of which is incorporated herein by reference.

BACKGROUND OF THE INVENTION

1. Field of the Invention

The present invention relates to a method of calculating forces acting on the footprint area of a tyre.

In particular the invention relates to calculation of forces oriented in a longitudinal direction (i.e. in a direction substantially parallel to the ground along which the tyre and wheel on which said tyre is mounted, move) and in a vertical direction (i.e. in a direction substantially perpendicular to the ground).

The invention also relates to an apparatus for calculating said forces.

2. Description of the Related Art

In the present context, the contact region between the tyre and ground will be referred to as "footprint area".

Presently felt is the necessity to calculate the forces acting on the tyre during running of the latter, in particular at the footprint area.

The estimate of these forces appears to be in fact critical for a reliable determination of possible danger situations, due to non-optimal ground conditions or too high speeds as compared with the travelling conditions of the vehicle.

SUMMARY OF THE INVENTION

As above mentioned, the forces taken into account herein are those extending in a vertical or longitudinal direction.

Calculation of these forces allows an estimate of the friction generated between the tyre and ground, thus enabling the electronic system mounted on the tyre to automatically act on the movements of the vehicle itself, above all on occurrence of sudden accelerations or brakings, which conditions are generally riskier for the driver who will loose the vehicle control.

The U.S. Pat. No. 5,913,240 discloses a system for determining the longitudinal forces generated between the tyre and ground, comprising at least one pair of markers mounted on the tyre at different radial distances from the hub, and at least one pair of detectors mounted integrally with the vehicle chassis so as to detect passage of the markers at each revolution of the wheel.

Depending on the phase displacement between the two detections representing the deformation suffered by the tyre following a braking or an acceleration for example, the longitudinal force generated in the footprint area is calculated.

U.S. Pat. No. 6,904,351 discloses a control system for vehicles in which the longitudinal force exerted on the tyre is calculated depending on: the torque applied to the wheel, the braking couple applied to the wheel, the vertical force, the moment of inertia of the wheel, the rotation speed of the wheel and the radius of the wheel itself.

The Applicant has found that the systems of known type such as those briefly described above for example, have a great complexity and therefore require hardware-software resources of high quality in order to obtain reliable measurements.

In particular, the Applicant has noticed that a system of the type described in U.S. Pat. No. 5,913,240 draws the estimate of the longitudinal force from detection of the position of two points that are radially very close to each other, i.e. the location of the two markers positioned on the tyre sidewall; therefore a very accurate detection is required to ensure reliability of the subsequent calculation of the forces.

The Applicant has also noticed that for a system of the type described in U.S. Pat. No. 6,904,351 it is required a high calculation capacity through which the longitudinal force is determined, due to the high number of variables on which the force intensity depends.

As mentioned above, in the present context by "footprint area" it is intended the outer tyre surface portion in contact with the ground. More specifically, the footprint area is herein defined between a first longitudinal end corresponding to the point at which the tyre comes into contact with the ground and a second longitudinal end corresponding to the point at which the tyre separates from the ground.

In the present specification and the subsequent claims, by "central angle" it is intended an angle having its vertex at the hub centre of the wheel to which said tyre belongs, and measured on a section perpendicular to the axis of the hub itself.

Within the scope of the present specification and the subsequent claims, by "median point" of the footprint area it is intended a median point on the longitudinal dimension of the footprint area itself.

Within the scope of the present specification and the subsequent claims, by "fixed point" it is intended the foot of the perpendicular to the ground passing through the hub centre.

With reference to FIGS. 2a-2f, the wheel is supposed to be rotating in a counterclockwise direction.

Within the scope of the present specification and the subsequent claims, by "angular position of the footprint area" (referred to, for the sake of clarity, as "first angular position") it is intended the central angle defined between a radius passing through the median point of the footprint area and the radius passing through said fixed point. The width of this angle is considered as positive when the shortest arc starting from the radius passing through the fixed point to reach the radius passing through the median point is traveled over by moving in a counterclockwise direction.

Within the scope of the present specification and the subsequent claims, by "angular position of the reference point" (referred to, for the sake of clarity, as "second angular position") it is intended the central angle defined between the radius passing through a reference point integral with wheel hub and the radius passing through said fixed point.

The width of this angle is considered as positive when the shortest arc starting from the radius passing through the fixed point to reach the radius passing through the reference point is traveled over by moving in a counterclockwise direction.

Within the scope of the present specification and the subsequent claims, by "phase displacement" it is intended the difference between the second and first angular positions. In other words, it is denoted the central angle defined between the radius passing through the reference point and the radius passing through the median point of the footprint area.

The first longitudinal end of the footprint area is identified by a corresponding angular position (referred to, for the sake of clarity, as "third angular position") defined as the central angle included between a radius passing through the first longitudinal end and the radius passing through said fixed point.

The width of this angle is considered as positive when the shortest arc starting from the radius passing through the fixed point to reach the radius passing through the first longitudinal end is traveled over by moving in a clockwise direction.

The second longitudinal end of the footprint area is identified by a corresponding angular position (referred to, for the sake of clarity, as "fourth angular position") defined as the central angle included between a radius passing through the second longitudinal end and the radius passing through said fixed point.

The width of this angle is considered as positive when the shortest arc starting from the radius passing through the fixed point to reach the radius passing through the second longitudinal end is traveled over by moving in a counterclockwise direction. The Applicant has perceived that, above all during a braking and acceleration step, a relative displacement occurs between the position of the footprint area and the hub on which the wheel is mounted. This is mainly due to the elastic properties of the tyre that becomes deformed due to the stresses to which it is submitted.

In particular, the Applicant could observe that said relative displacement is above all caused by the longitudinal force to which the tyre is submitted at the footprint area.

The Applicant could therefore ascertain that the relative displacement between the wheel hub and the footprint area can be measured in terms of difference between the angular position of the hub (i.e. the angular position of said reference point) and the angular position of the footprint area.

The Applicant has further noticed that the longitudinal force also depends on the longitudinal speed of the wheel which practically is the linear displacement velocity of the wheel in a direction substantially parallel to the ground and defined by the advancing direction of the wheel itself.

Since the longitudinal speed of the wheel and the angular velocity of same are substantially proportional to each other based on the radius R of the tyre, it was noticed that this dependence can also be expressed as a function of the angular velocity of the wheel.

The Applicant has finally found that a functional relation can be determined between the phase displacement, the longitudinal width of the footprint area, the longitudinal speed (angular velocity) of the wheel, and the longitudinal force acting on the tyre, thus determining the longitudinal force itself.

In particular, in a first aspect the present invention relates to a method of calculating forces acting on the footprint area of a tyre, said tyre being mounted on a wheel in turn mounted on a vehicle hub, said tyre being moved along a longitudinal direction substantially parallel to the ground, said method comprising the following steps:

detecting a first angular position of said footprint area;
detecting a second angular position of a reference point substantially integral with said hub;
determining a phase displacement between said reference point and footprint area;
determining a parameter representing an angular velocity of said wheel;
calculating at least one longitudinal force in said footprint area as a function of at least said phase displacement and parameter.

To obtain a still more accurate estimate of the longitudinal force, also the longitudinal width of the footprint area can be taken into account.

In the preferred embodiment, also a step of calculating a vertical force in the footprint area is performed, as a function of at least the longitudinal width of the footprint area itself and said parameter.

Preferably, calculation of the vertical force is carried out also as a function of said phase displacement.

In accordance with a second aspect, the invention relates to an apparatus for calculating forces acting on a footprint area of a tyre, said tyre being mounted on a wheel in turn mounted on a vehicle hub, said tyre being moved along a longitudinal direction substantially parallel to the ground, said apparatus comprising:

a first sensor to detect a first angular position of said footprint area;
a second sensor to detect a second angular position of a reference point substantially integral with said hub;
a processing unit operatively associated with said first and second sensors, provided with:
a comparison block to determine a phase displacement between said reference point and footprint area;
a first calculation block to calculate at least one longitudinal force in said footprint area as a function of at least said phase displacement and of a parameter representing an angular velocity of said wheel.

The processing unit may further comprise a second calculation block to determine a longitudinal width of said footprint area.

The first calculation block is preferably operatively associated with the second calculation block to calculate said longitudinal force also as a function of said longitudinal width.

In the preferred embodiment, the processing unit further comprises a third calculation block to calculate a vertical force in said footprint area, as a function at least of said longitudinal width and parameter.

Preferably, the third calculation block is operatively associated with the comparison block to calculate said vertical force also as a function of said phase displacement.

Further features and advantages will become more apparent from the detailed description of a preferred but not exclusive embodiment of a method of calculating forces acting on the footprint area of a tyre as well as of an apparatus for calculating said forces, in accordance with the present invention.

BRIEF DESCRIPTION OF THE DRAWINGS

This description will be set out hereinafter with reference to the accompanying drawings, given by way of non-limiting example, in which:

FIG. 4 shows a signal generated by a sensor associated with the tyre seen in FIG. 1;

DETAILED DESCRIPTION OF THE INVENTION

Figure 1:
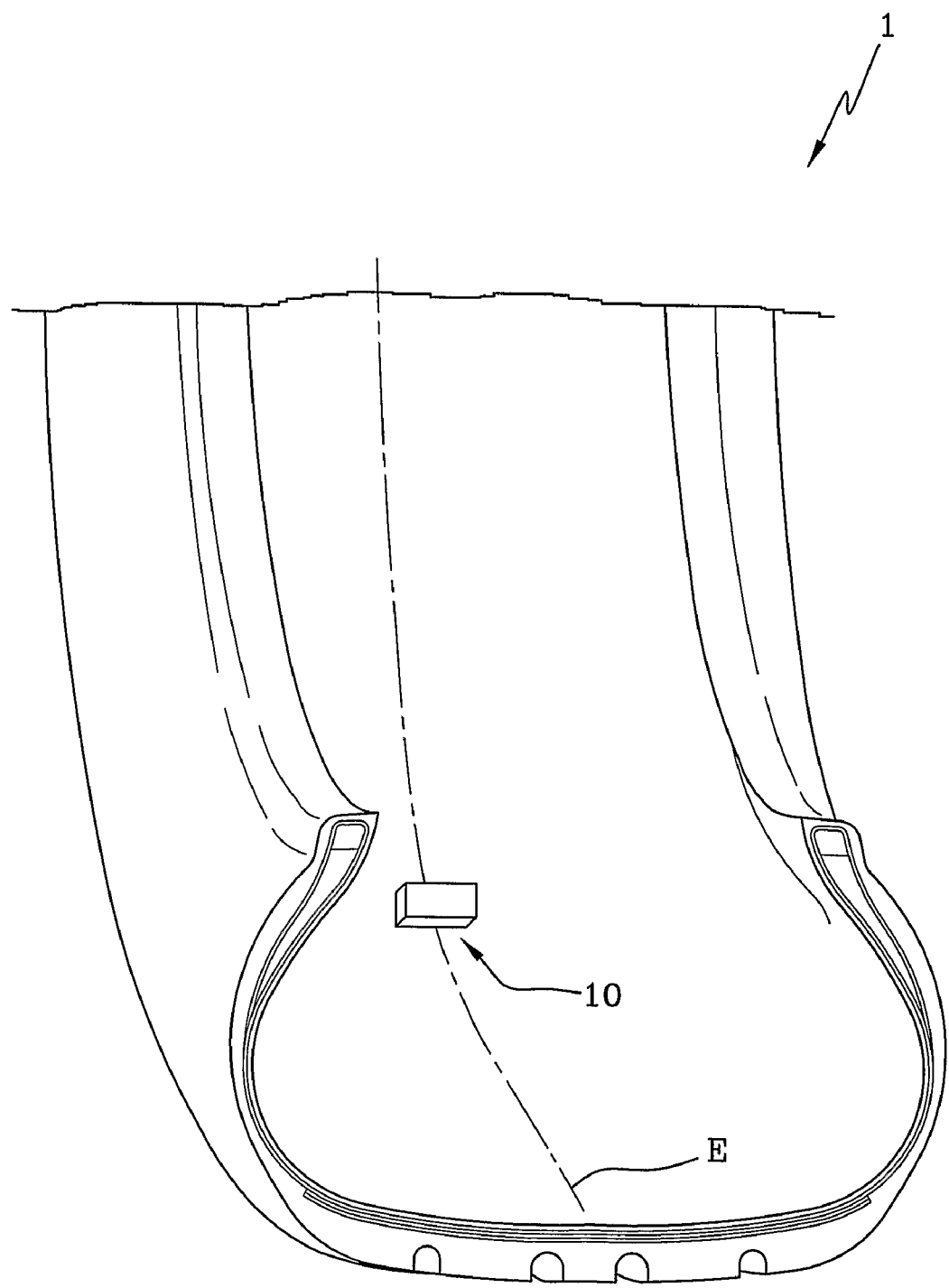
FIG. 1 is a partial perspective view of a tyre to which the method of the present invention is applied.

With reference to the drawings, a tyre used for performing the method of the invention has been generally identified by reference numeral 1.

Tyre 1 is mounted on a wheel 2, in turn mounted on a hub 3; through the hub 3, the wheel 2 is associated with a vehicle (not shown) to enable running of same.

During running of the vehicle, the tyre 1 rolling on the ground is submitted to a displacement in a longitudinal direction substantially parallel to the ground itself.

Figure 2A:
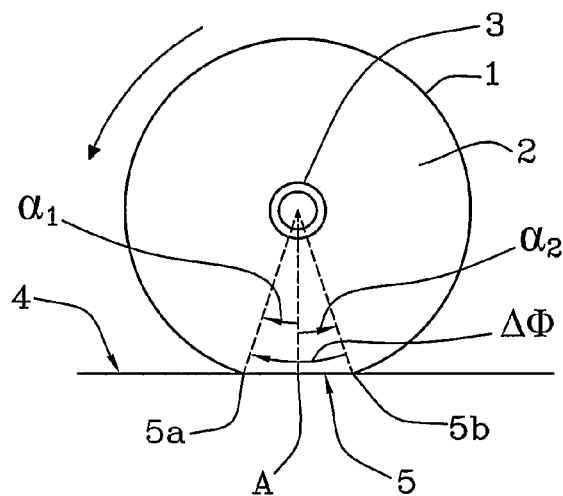
FIGS. 2a-2f are diagrammatic side views of a wheel on which the tyre seen in FIG. 1 is mounted, and highlighting the parameters used in the method of the invention.
Figure 2B:
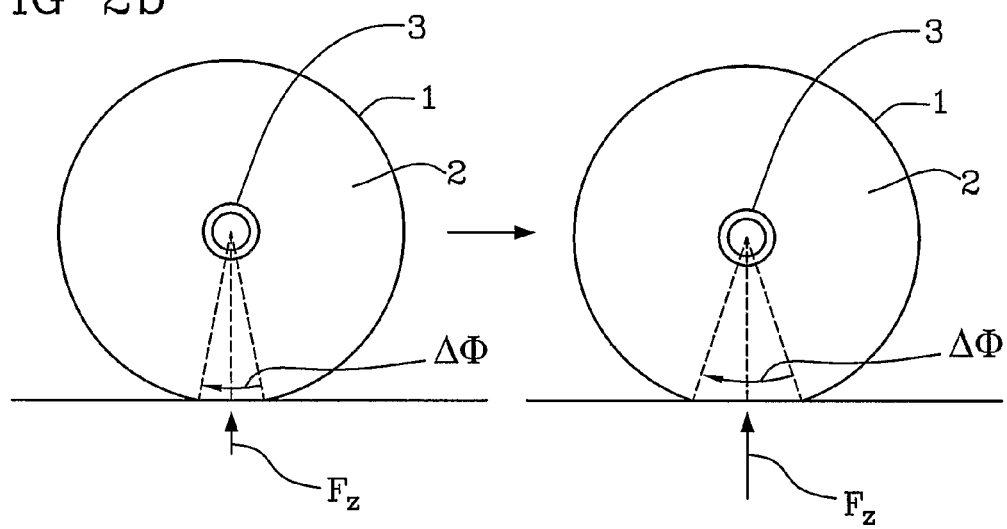
Figure 2C:
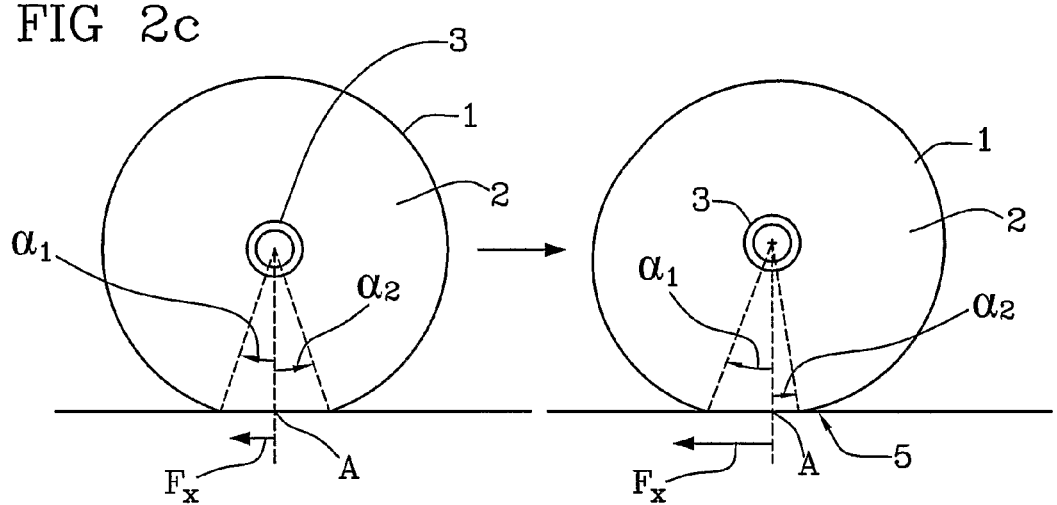
Figure 2D:
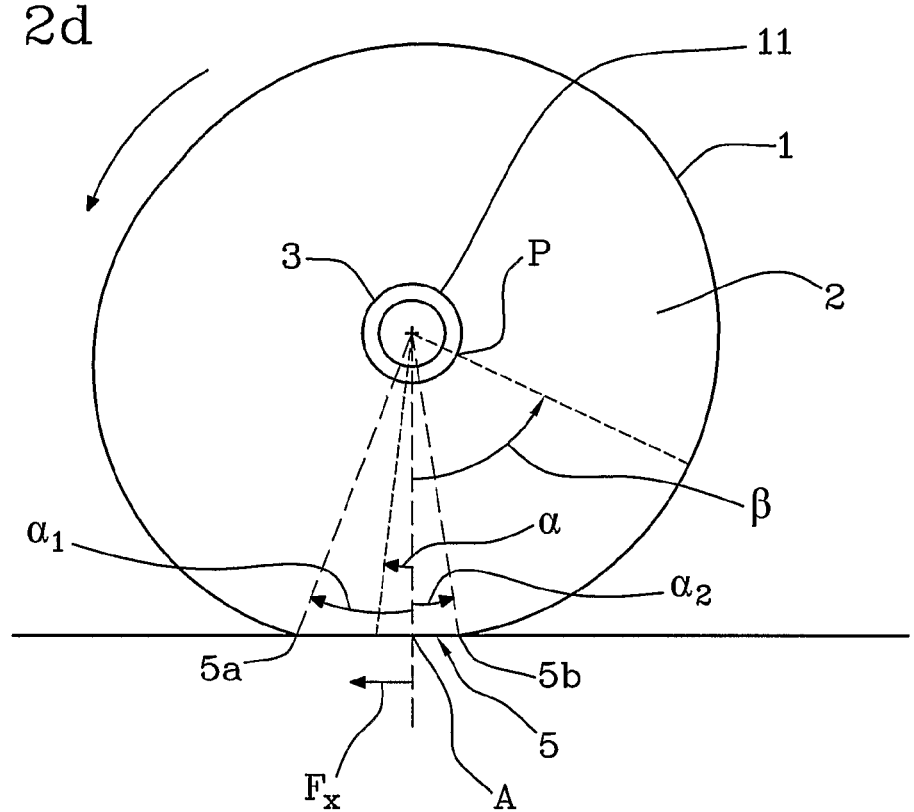

The method of the invention first of all comprises a step of detecting a first angular position α of the footprint area 5 (FIGS. 2a, 2d).

Note that the fixed point relative to which the different angular positions are estimated is denoted at "A" in the accompanying drawings:

As above mentioned, the footprint area 5 is defined by the outer-surface portion of tyre 1 in contact with the ground 4.

Then detection is carried out of a second angular position β of a reference point P substantially integral with the hub 3.

As it will become apparent in the following, through a comparison between the first and second angular positions α, β, it will be possible to determine the forces generated between the footprint area 5 and the ground 4.

Preferably, the step of detecting the first angular position α comprises a step of detecting a third angular position α1 of the footprint area 5, said third angular position α1 defining a first longitudinal end 5a of the footprint area 5 itself. In particular, the first longitudinal end 5a can be the point at which the outer surface of tyre 1 contacts the ground 4.

Preferably, the step of detecting the first angular position α further comprises a step of detecting a fourth angular position α2 of the footprint area 5, said fourth angular position defining a second longitudinal end 5b of the footprint area 5 itself. In particular, the second longitudinal end 5b can be the point at which the outer surface of tyre 1 separates from the ground.

Therefore the first angular position α can be determined as a function of the third and/or fourth angular positions α1, α2. In particular, the first angular position α can be included between the third and fourth angular positions α1, α2.

In the preferred embodiment, the first angular position α is the median angular position between the third and fourth angular positions α1, α2; in other words, the difference between the first angular position α and the third angular position α1 is preferably substantially the same as the difference between the fourth angular position α2 and the first angular position α.

Advantageously, detection of the third angular position α1 is carried out through detection of a corresponding first peak P1 generated by a first sensor 10 mounted in tyre 1. This first sensor 10, at the first longitudinal end 5a of the footprint area 5 generates a first peak P1 (a voltage peak, for example), following the great discontinuity of the stresses to which tyre 1 is submitted.

Likewise, detection of the fourth angular position α2 is carried out through detection of a corresponding second peak P2 generated by said first sensor 10, preferably at the second end 5b of the footprint area 5.

As shown in FIG. 4, the output signal of the first sensor 10 has an approximately constant course inside each revolution carried out by tyre 1, except for the two peaks P1 and P2: these peaks are generated following the severe pulse stresses to which tyre 1 is submitted at the first and second longitudinal ends 5a, 5b of the footprint area 5.

In more detail, the trailing edge is taken as reference for the first peak P1 while the leading edge is taken as reference for the second peak P2. A zero-crossing algorithm is applied to said leading and trailing edges to determine the instant at which tyre 1 respectively comes into contact with the ground 4 (thereby defining the third angular position α1) and separates therefrom (thus defining the fourth angular position α2).

Due to application of said algorithm, the number of the required information to identify the longitudinal ends 5a, 5b of the footprint area 5 is minimised, so that communication between sensor 10 and the electronic elements mounted onboard the vehicle is made less complicated. In fact, the only transmission of the position of the two points (or the corresponding time instants) identifying the ends 5a, 5b of the footprint area 5 is quicker and "lighter" than transmission of the whole signal generated by the first sensor 10.

Preferably, the first sensor 10 is an accelerometer of the piezoelectric type for example, provided to measure the acceleration to which tyre 1 has been submitted in a radial direction; by way of example, an accelerometer ENDEVCO® 7264B can be used. Alternatively, the first sensor 10 can be a sensor of the acoustic or optical type or a strain gauge.

As diagrammatically shown in FIG. 1, the first sensor 10 can be mounted on the inner surface of tyre 1, in particular at the equatorial plane E thereof. Connection between the first sensor 10 and the inner surface of tyre 1 can be obtained by gluing, for example.

The method in accordance with the invention, as above mentioned, comprises a step of detecting a second angular position β of a reference point P integral with hub 3. This second angular position β is preferably determined as a function of a position signal generated by a second sensor 11 mounted on the hub 3 of wheel 2.

In the preferred embodiment, the second sensor 11 is a rotary encoder. Advantageously, the second sensor 11 may comprise an Hall-effect inductive encoder measuring the rotation speed of wheel 2; in particular, the second sensor can output a sinusoidal signal substantially proportional to the angular velocity ω of wheel 2.

Preferably four encoders are present on the vehicle, each of them being associated with a respective wheel as part of the ABS system. Each encoder outputs a sinusoidal signal the frequency of which is proportional to the rotation speed of the corresponding wheel.

Should said encoder be used, a processing step is preferably performed in order to obtain the angular position of the reference point P as a function of the angular velocity of wheel 2, by an estimate of the angular position of the hub 3 of wheel 2 for example, through signal-processing techniques applied to the sinusoidal signal detected by the encoder.

Figure 2E:
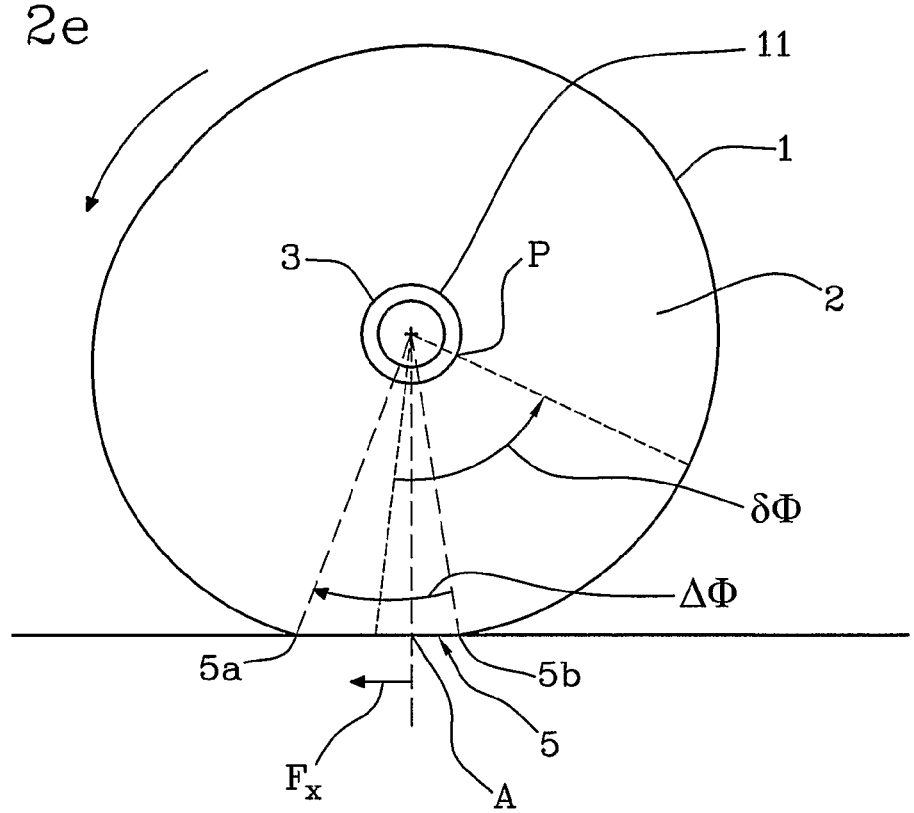
Figure 2F:
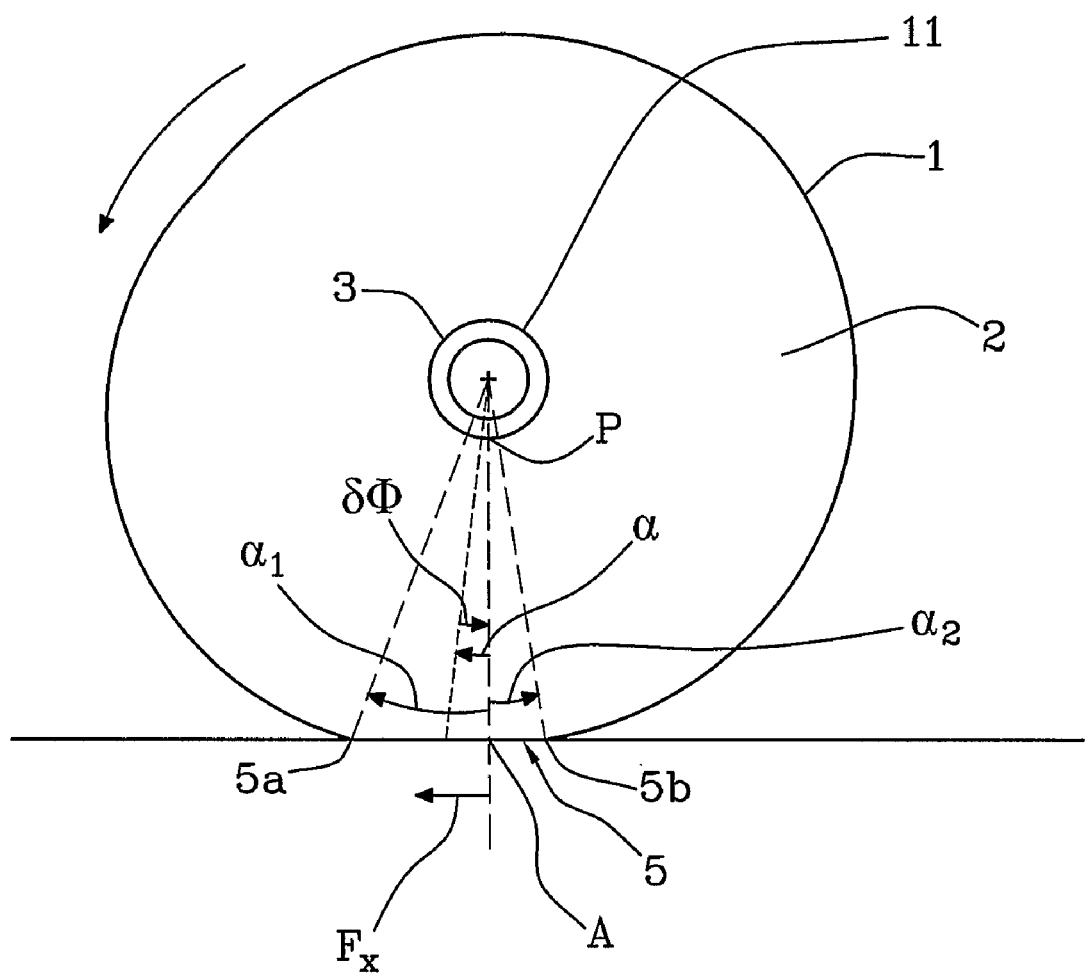

Once the first and second angular positions α, β, have been identified, a comparison is carried out between the same to determine a phase displacement δφ between the reference point P and the footprint area 5 (FIGS. 2d-2f).

The phase displacement δφ as above illustrated is defined by the difference between the second angular position β of the reference point P and the first angular position α of the footprint area 5.

Practically, through calculation of the phase displacement δφ, i.e. the relative displacement between a point integral with wheel 2 and a point integral with tyre 1, the deformation in a longitudinal direction suffered by the tyre 1 is quantified following the efforts generated at the footprint area 5.

FIG. 2f shows the particular case in which the phase displacement δφ is determined when the angle defining the second angular position β is substantially zero, i.e. when the reference point P is positioned on the perpendicular to the ground passing through the centre of hub 3. In this case it appears that, the above described definitions represented in FIGS. 2a-2f being adopted, the following relation is verified:

$$\delta\phi = -\alpha$$

This means that, except the sign, the phase displacement δφ and the angle defining the first angular position α are substantially equal.

A further step provided by the method according to the invention consists in determining a parameter k representative of the angular velocity ω of the wheel 2.

The parameter k, as said, can be the angular velocity ω of the wheel 2, for example; in this case the parameter k can be calculated starting either from the second angular position β detected in time or starting from a detection of the longitudinal speed v of the wheel 2, through a third sensor 12 in particular of the optical type, for example.

In fact, application of the following relation is sufficient:

$$\omega = v/R$$

wherein R is the radius of tyre 1, to obtain the angular velocity ω starting from the longitudinal speed v.

Alternatively, the parameter k can be the longitudinal speed v of wheel 2; in this event, the parameter k can be obtained from a direct detection (through said third sensor 12, for example), or it can be calculated starting from the second angular position β detected in time (i.e. the angular velocity ω) by application of the above quoted relation.

The phase displacement δφ and parameter k being known, a first calculation of a longitudinal force $F_x$ can be carried out at the footprint area 5, as a function of at least on the phase displacement δφ and the parameter k. In other words, the longitudinal force $F_x$ can be calculated as a function of the phase displacement δφ and the angular velocity ω (or longitudinal speed v) of the wheel 2.

Figure 5A:
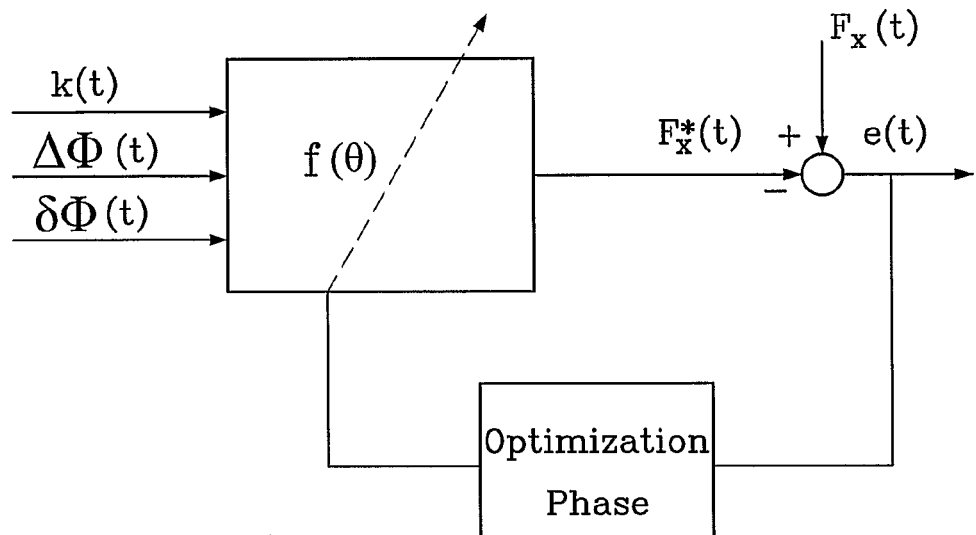
FIGS. 5a and 5b show block diagrams representing an estimate operation of the relations between the parameters detected in putting into practice the method of the invention and the forces to be calculated.

FIG. 5a shows a diagram representing a mode for defining the functional relation between the longitudinal force $F_x$, the phase displacement δφ and the parameter k. The diagram also refers to a third parameter (the longitudinal width Δφ of the footprint area 5) to be described in the following; in any case, for a first estimate of the longitudinal force $F_x$ it is possible to consider the phase displacement δφ and parameter k alone.

The function f that exactly links the longitudinal force $F_x$ to the phase displacement δφ and parameter k, depends on a series of parameters generally included in vector θ.

The procedure is based on minimisation of the estimate error e(t), defined by the following relation:

$$e(t) = F_x(t) - F_x^*(t)$$

wherein $F_x^*(t)$ is the current estimate of the longitudinal force $F_x(t)$.

During this step of setting the system, the instantaneous values of the longitudinal force $F_x(t)$ must be experimentally drawn, so as to be able to map the estimate function $F_x^*(t)$ and use the same for calculations to be carried out later on.

The block relating to the optimisation step may comprise any approximation algorithm utilising any type of non-linear parameter function such as neural networks, polynomials, splines, etc., for example.

At each instant, the optimisation block outputs an estimate of the parameters θ updating the parameters of the function f(θ) so as to reduce the estimate error for each iteration.

Preferably, the function f(θ) is such determined that the function $F_x^*(t)$ appears to be a monotonic function, and in particular an increasing monotonic function with respect to the phase displacement δφ.

As above mentioned, a further parameter that can be taken into consideration is the longitudinal width Δφ of the footprint area 5.

In fact, the method in accordance with the invention can contemplate a calculation step of this longitudinal width Δφ, preferably as a function of the third and fourth angular positions α1, α2. Practically, a difference between the third and fourth angular positions α1, α2 is carried out so as to obtain the longitudinal width Δφ.

Thus the longitudinal force Fx can be calculated as a function of the longitudinal width Δφ as well.

The specific functional relation between $F_x$ and Δφ is preferably determined following the above described diagram seen in FIG. 5a.

In the preferred embodiment, the method of the invention further comprises a step of calculating a vertical force $F_z$ at the footprint area 5, as a function of the longitudinal width Δφ of the parameter k. Preferably, the vertical force $F_z$ is also calculated as a function of the phase displacement δφ.

Figure 5B:
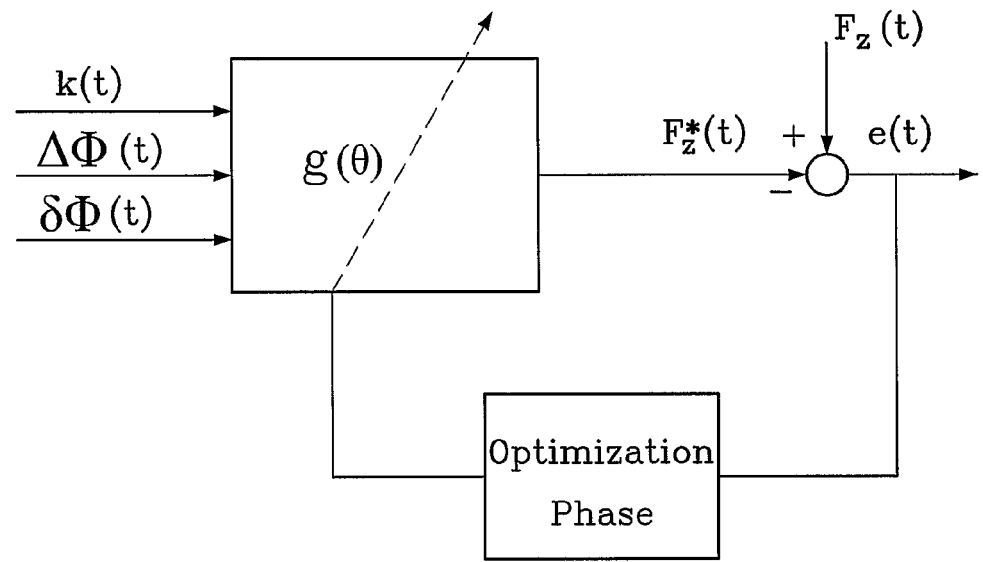

The functional relation between the above mentioned magnitudes $F_z$, Δφ, k, δφ, can be determined following the diagram in FIG. 5b: the function g linking $F_z$ to the longitudinal width Δφ, to the parameter k and preferably to the phase displacement δφ, depends on a series of parameters generally included in vector θ.

The procedure is based on minimisation of the estimate error e(t) defined by the following relation:

$$e(t) = F_z(t) - F_z^*(t)$$

wherein $F_z^*(t)$ is the current estimate of the vertical force $F_z(t)$.

During this setting step of the system, the instantaneous values of the vertical force $F_z(t)$ must be experimentally drawn, so as to be able to map the estimate function $F_z^*(t)$ and use the same for calculations to be carried out later on.

The block relating to the optimisation step may comprise any approximation algorithm utilising any type of non-linear parameter function such as neural networks, polynomial, splines, etc., for example At each instant, the optimisation block outputs an estimate of the parameters θ updating the parameters of the function g(θ) so as to reduce the estimate error for each iteration.

Preferably, the function g(θ) is such determined that the function $F_z^*(t)$ appears to be a monotonic function, and in particular an increasing monotonic function with respect to the longitudinal width Δφ.

Advantageously, the method of the invention can involve a self-gauging step to determine a possible initial phase displacement between the hub 3 and tyre 1.

In fact, due to the continuous stresses to which tyre 1 and wheel 2 are submitted, a progressive drift of tyre 1 on wheel 2 is likely to occur so that the angular position of the reference point P and angular position of the footprint area 5, i.e. said second and first angular positions β, α, respectively, appear to be mutually out of phase even when important vertical or longitudinal forces are not generated at the footprint area 5 (when the vehicle is not running, for example).

It is therefore advantageous to check the existence of this possible initial phase displacement on activation of the detection and measurement system, so as to make calculation of the longitudinal $F_x$ and vertical $F_z$ forces independent of the initial phase displacement itself and therefore only depending on the above described variable dynamics.

FIG. 2b diagrammatically shows the effect of the vertical force $F_z$ on the longitudinal width Δφ; on increasing of the intensity of $F_z$, a corresponding increasing of the longitudinal width Δφ takes place.

Likewise, FIG. 2c shows the effect of the longitudinal force $F_x$ on the phase displacement δφ (for better understanding reference is to be simultaneously made to FIG. 2e); on increasing of the longitudinal force $F_x$ there is a corresponding increase in the phase displacement δφ.

Figure 3A:
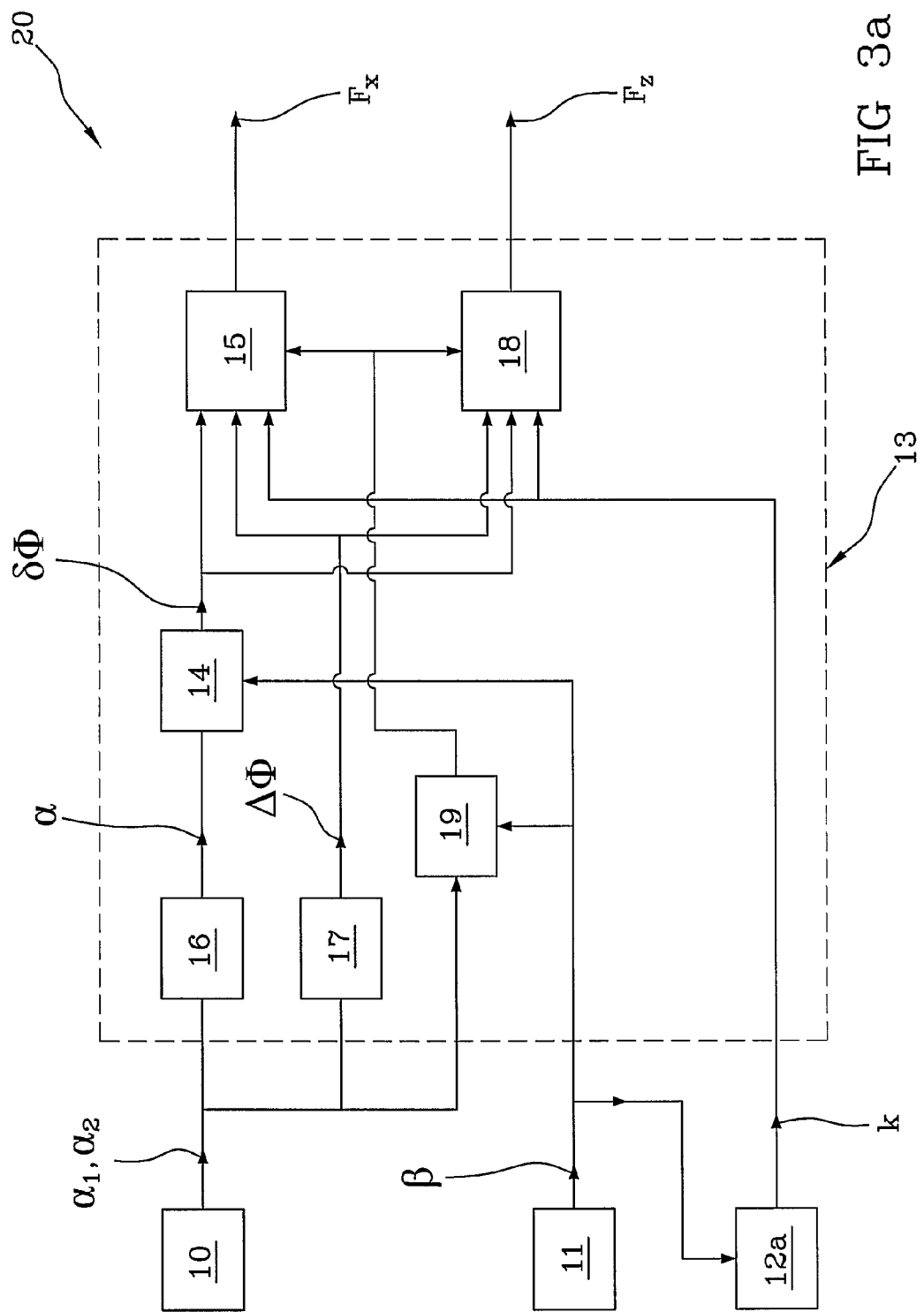
FIGS. 3a-3b show block diagrams of two embodiments of an apparatus associated with the tyre seen in FIG. 1.
Figure 3B:
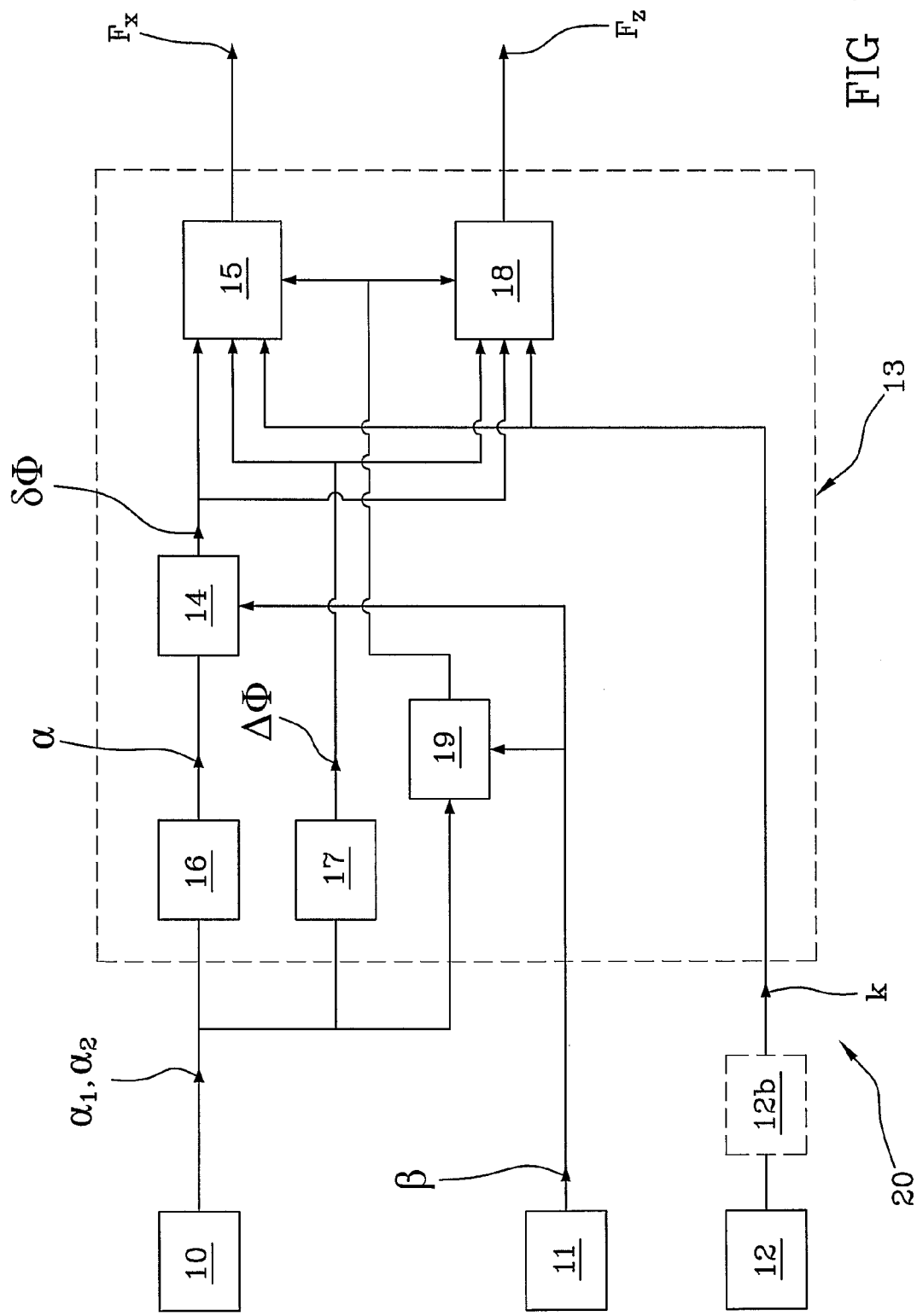

FIGS. 3a-3b show the block diagrams of two embodiments of an apparatus 20 by which the method of the invention can be put into practice.

Apparatus 20 comprises a first sensor 10, to detect the first angular position α of the footprint area 5, a second sensor 11 to detect the second angular position β of the reference point P integral with the hub 3 and preferably an operating element 12, 12a to determine said parameter k.

As above said, the first sensor 10 is preferably mounted on the inner surface of tyre 1, in particular in the equatorial plane E of said tyre 1.

Preferably, the second sensor 11 is mounted on the hub 3 of wheel 2 on which tyre 1 is engaged.

In a preferred embodiment, the parameter k can be the angular velocity ω of wheel 2; in this case the operating element may comprise a calculation circuit 12a (FIG. 3a), operatively associated with the second sensor 11 to calculate the angular velocity ω as a function of subsequent detections of the second angular position β.

Alternatively, the operating element may comprise a third sensor 12, of the optical type for example, to detect the longitudinal speed v of wheel 2; starting from this longitudinal speed v, the angular velocity ω can be determined by means of an auxiliary calculation block 12b (FIG. 3b).

In another preferred embodiment, the parameter k can be the longitudinal speed v of the wheel 2. For determination of this longitudinal speed v, the operating element may comprise a calculation circuit 12a (FIG. 3a) operatively associated with the second sensor 11 that, as a function of the detections of the second angular position β, calculates the longitudinal speed v.

Alternatively, the longitudinal speed v can be directly measured by the third sensor 12 (FIG. 3b).

Apparatus 20 further comprises a processing unit 13 operatively associated with the first and second sensors, 10 and 11, and preferably with the operating element 12, 12a.

The processing unit 13 is provided with a comparison block 14 to compare the first angular position α and second angular position β with each other so as to obtain the phase displacement δϕ between the reference point P and the footprint area 5.

The processing unit 13 in addition comprises a first calculation block 15 to calculate the longitudinal force $F_x$ as a function at least of the phase displacement δϕ and said longitudinal speed v.

Preferably, the processing unit 13 further comprises an auxiliary circuit 16 to determine said first angular position α; in particular, the auxiliary circuit 16 is operatively associated with the first sensor 10 to receive the third and fourth angular positions α1, α2 defining the longitudinal ends 5a, 5b of the footprint area 5.

The auxiliary circuit 16 therefore calculates the first angular position α as a function of the third and/or fourth angular positions α1, α2.

As mentioned above, the first angular position α can be included between the third and fourth angular positions α1, α2 and more particularly can define a median position between said third and fourth angular positions α1, α2.

Preferably, the processing unit 13 also comprises a second calculation block 17 operatively associated with the first sensor 10 to determine the longitudinal width Δϕ of the footprint area 5, in particular as a function of the third and fourth angular positions α1, α2; more specifically the longitudinal width Δϕ of the footprint area 5 is determined by carrying out a difference between the third and fourth angular positions α1, α2.

The second calculation block 17 is operatively associated with the first calculation block 15 too, so that the longitudinal force $F_x$ can be calculated also as a function of the longitudinal width Δϕ.

Preferably, the processing unit 13 further comprises a third calculation block 18 to calculate the vertical force $F_z$ at the footprint area 5 as a function of at least the longitudinal width Δϕ and the longitudinal speed v.

In the preferred embodiment the third calculation block 18 is operatively associated with the comparison block 14 as well, to calculate the vertical force $F_z$ also as a function of the phase displacement δϕ.

The processing unit 13 may in addition comprise a self-gauging block 19, operatively associated with the first and second sensors 10, 11 to determine a possible initial phase displacement between the footprint area 5 and the reference point P.

It is also to be pointed out that the processing unit 13 was divided into blocks and functional circuits for the only purpose of describing the operating functions of same in a clear manner; the practical accomplishment of the processing unit 13 itself can leave said division out of consideration and be defined according to the used technology. For instance, the whole processing unit 13 can be made as a single circuit mounted onboard the vehicle and provided for talking to the different sensors for execution of the above described operations; in particular, communication with the first sensor 10 can be carried out via wireless technology, by positioning a battery-operated power unit and a transmission device on the rim of wheel 2 for a wired connection with the first sensor 10 and a wireless communication with the onboard devices.

By way of example, the signals can be sampled to a frequency included between 5 and 15 KHz; the resolution can be of 16 bits, for example.

The invention claimed is:

1. A method implemented by a processing unit of calculating forces acting on a footprint area of a tyre, said tyre being mounted on a wheel, which in turn, is mounted on a vehicle hub, said tyre being moved along a longitudinal direction substantially parallel to the ground, the method comprising:
    determining, by a processing unit, a first angular position of said footprint area;
    detecting a second angular position of a reference point substantially integral with said hub;
    determining a phase displacement between said reference point and said footprint area;
    determining a parameter representing an angular velocity of said wheel; and
    calculating at least one longitudinal force in said footprint area as a function of said phase displacement and said parameter.

2. The method as claimed in claim 1, wherein the step of detecting said first angular position comprises:
    detecting a third angular position of said footprint area defining a first longitudinal end of said footprint area;
    detecting a fourth angular position of said footprint area defining a second longitudinal end of said footprint area opposite said first longitudinal end; and
    determining said first angular position as a function of said third angular position and/or said fourth angular position.

3. The method as claimed in claim 2, wherein said first angular position is between said third and fourth angular positions.

4. The method as claimed in claim 3, wherein the step of detecting said fourth angular position comprises a step of detecting a second peak generated by a first sensor.

5. The method as claimed in claim 4, wherein said third or fourth angular position is determined by a zero-crossing algorithm applied to a leading or trailing edge of said first or second peak.

6. The method as claimed in claim 4, wherein said first sensor is an accelerometer.

7. The method as claimed in claim 2, wherein the step of detecting said third angular position comprises a step of detecting a first peak generated by a first sensor mounted in said tyre.

8. The method as claimed in claim 2, further comprising a step of detecting a longitudinal width of said footprint area.

9. The method as claimed in claim 8, wherein said longitudinal width is calculated as a function of said third and fourth angular positions.

10. The method as claimed in claim 8, wherein a longitudinal force is also calculated as a function of said longitudinal width.

11. The method as claimed in claim 8, further comprising a step of calculating a vertical force in said footprint area as a function of at least said longitudinal width and said parameter.

12. The method as claimed in claim 11, wherein said vertical force is also calculated as a function of said phase displacement.

13. The method as claimed in claim 1, wherein said second angular position is determined as a function of a position signal generated by a second sensor mounted on the hub of said wheel.

14. The method as claimed in claim 1, further comprising a self-gauging step to determine an initial phase displacement between the first angular position of the footprint area and the second angular position of said reference point.

15. The method as claimed in claim 1, wherein said parameter is a longitudinal speed of said wheel.

16. The method as claimed in claim 15, wherein the step of determining said parameter comprises a step of measuring said longitudinal speed.

17. The method as claimed in claim 15, wherein the step of determining said parameter comprises:
   detecting the angular velocity of said wheel; and
   calculating said longitudinal speed as a function of said angular velocity.

18. The method as claimed in claim 1, wherein said parameter is an angular velocity of said wheel.

19. The method as claimed in claim 18, wherein the step of determining said parameter comprises a step of measuring said angular velocity.

20. The method as claimed in claim 18, wherein the step of determining said parameter comprises:
   detecting the longitudinal speed of said wheel; and
   calculating said angular velocity as a function of said longitudinal speed.

21. The method as claimed in claim 1, wherein said reference point is positioned on a perpendicular to the ground passing through the centre of the hub.

22. An apparatus for calculating forces acting on a footprint area of a tyre, said tyre being mounted on a wheel, which in turn, is mounted on a vehicle hub, said tyre being moved along a longitudinal direction substantially parallel to the ground, comprising:
   a first sensor to facilitate determining a first angular position of said footprint area;
   a second sensor to detect a second angular position of a reference point substantially integral with said hub;
   a processing unit operatively associated with said first and second sensors, provided with:
      a comparison block to determine a phase displacement between said reference point and said footprint area; and
      a first calculation block to calculate at least one longitudinal force in said footprint area as a function of said phase displacement and of a parameter representing an angular velocity of said wheel.

23. The apparatus as claimed in claim 22, wherein said processing unit comprises an auxiliary circuit operatively associated with said first sensor to receive therefrom a third angular position of said footprint area defining a first longitudinal end of said footprint area, as well as a fourth angular position of said footprint area defining a second longitudinal end of said footprint area opposite said first longitudinal end, said auxiliary circuit being designed to determine said first angular position as a function of said third and/or fourth angular position.

24. The apparatus as claimed in claim 23, wherein said first angular position is between said third and fourth angular positions.

25. The apparatus as claimed in claim 23, wherein said third angular position is defined by a first peak detected by said first sensor.

26. The apparatus as claimed in claim 25, wherein said fourth angular position is defined by a second peak detected by said first sensor.

27. The apparatus as claimed in claim 26, wherein said third or fourth angular position is determined by means of a zero-crossing algorithm applied to a leading or trailing edge of said first or second peak.

28. The apparatus as claimed in claim 22, wherein said first sensor is mounted in said tyre.

29. The apparatus as claimed in claim 28, wherein said first sensor is positioned in an equatorial plane of said tyre.

30. The apparatus as claimed in claim 22, wherein said first sensor is an accelerometer.

31. The apparatus as claimed in claim 22, wherein said second sensor is mounted on the hub of said wheel.

32. The apparatus as claimed in claim 31, wherein said second sensor is a rotary encoder.

33. The apparatus as claimed in claim 22, wherein said processing unit further comprises a second calculation block to determine a longitudinal width of said footprint area.

34. The apparatus as claimed in claim 33, wherein said second calculation block is operatively associated with said first sensor to determine said longitudinal width as a function of third and fourth angular positions.

35. The apparatus as claimed in claim 33, wherein said first calculation block is operatively associated with said second calculation block to calculate a longitudinal force also as a function of said longitudinal width.

36. An apparatus as claimed in claim 33, wherein said processing unit further comprises a third calculation block to calculate a vertical force in said footprint area as a function at least of said longitudinal width and said parameter.

37. The apparatus as claimed in claim 36, wherein said third calculation block is operatively associated with said comparison block to calculate said vertical force also as a function of said phase displacement.

38. The apparatus as claimed in claim 22, wherein said processing unit further comprises a self-gauging block operatively associated with said first and second sensors to determine an initial phase displacement between the first angular position of the footprint area and the second angular position of said reference point.

39. The apparatus as claimed in claim 22, comprising an operating element to determine said parameter.

40. The apparatus as claimed in claim 39, wherein said operating element comprises a calculation circuit operatively associated with said second sensor to calculate said parameter as a function of said second angular position detected in time.

41. The apparatus as claimed in claim 39, wherein said operating element comprises a third sensor to detect said parameter.

42. The apparatus as claimed in claim 39, wherein said operating element is operatively associated with said processing unit.

43. The apparatus as claimed in claim 22, wherein said parameter is an angular velocity of said wheel.

44. The apparatus as claimed in claim 22, wherein said parameter is a longitudinal speed of said wheel.

* * * * *